Patented Oct. 16, 1934

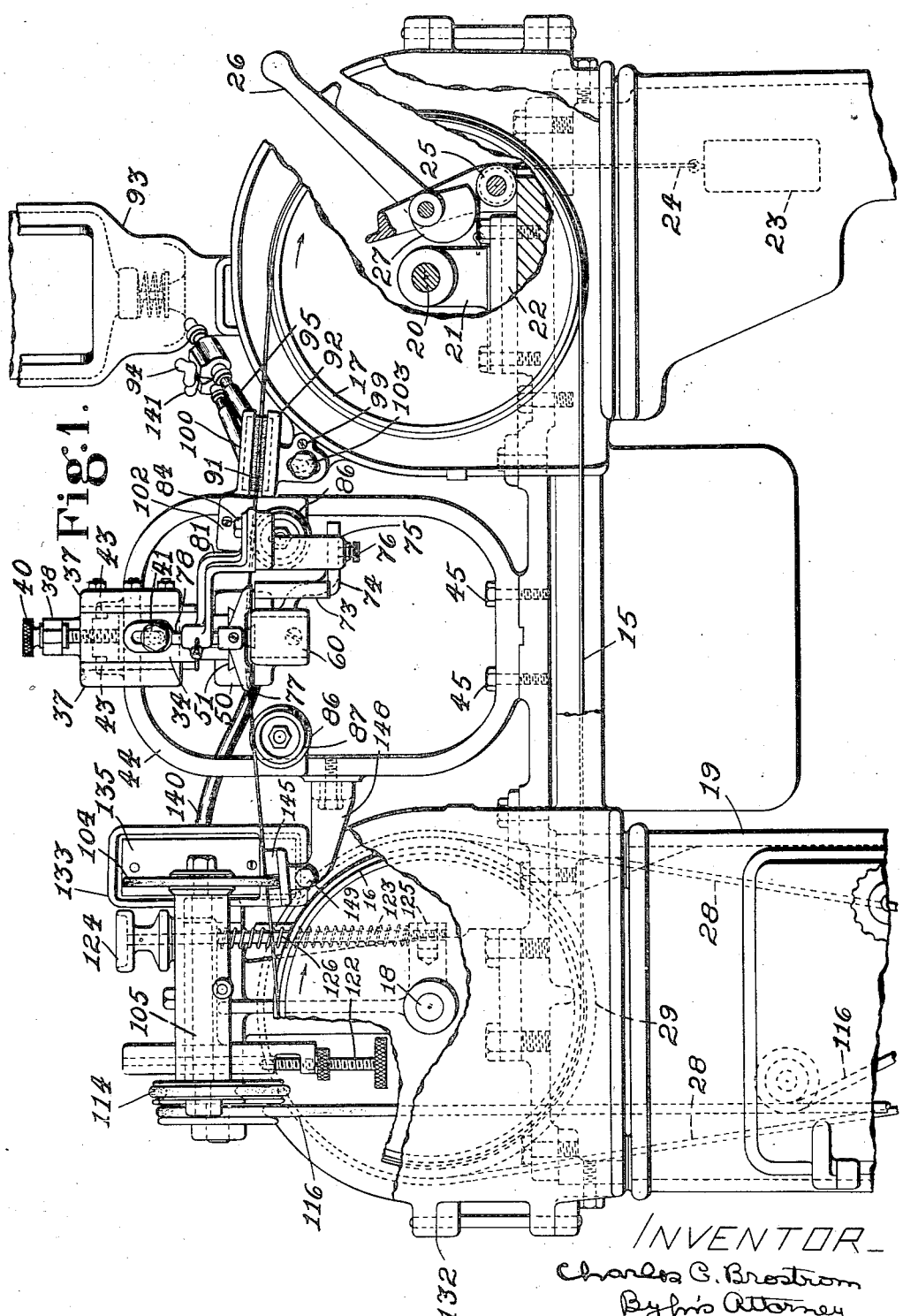

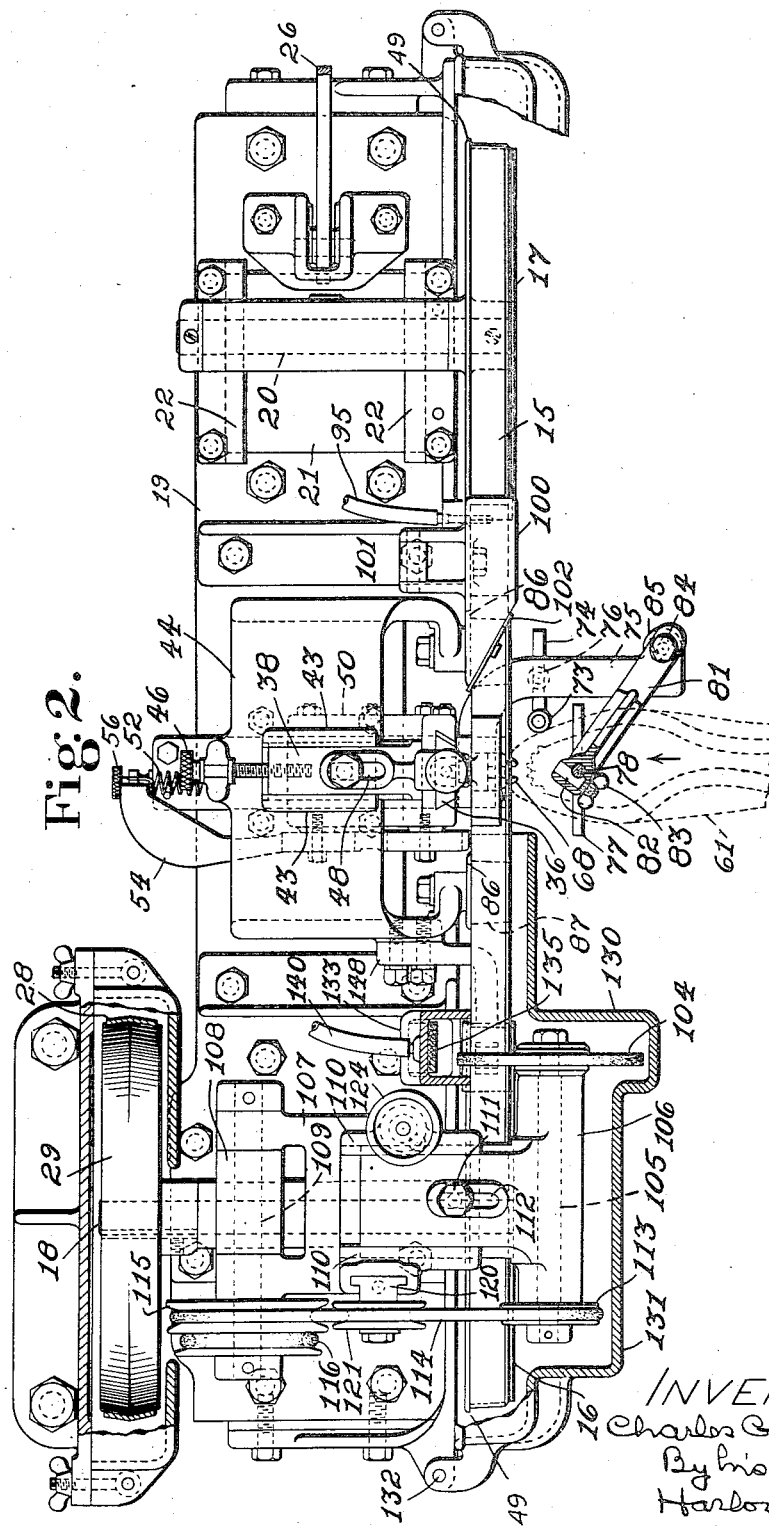

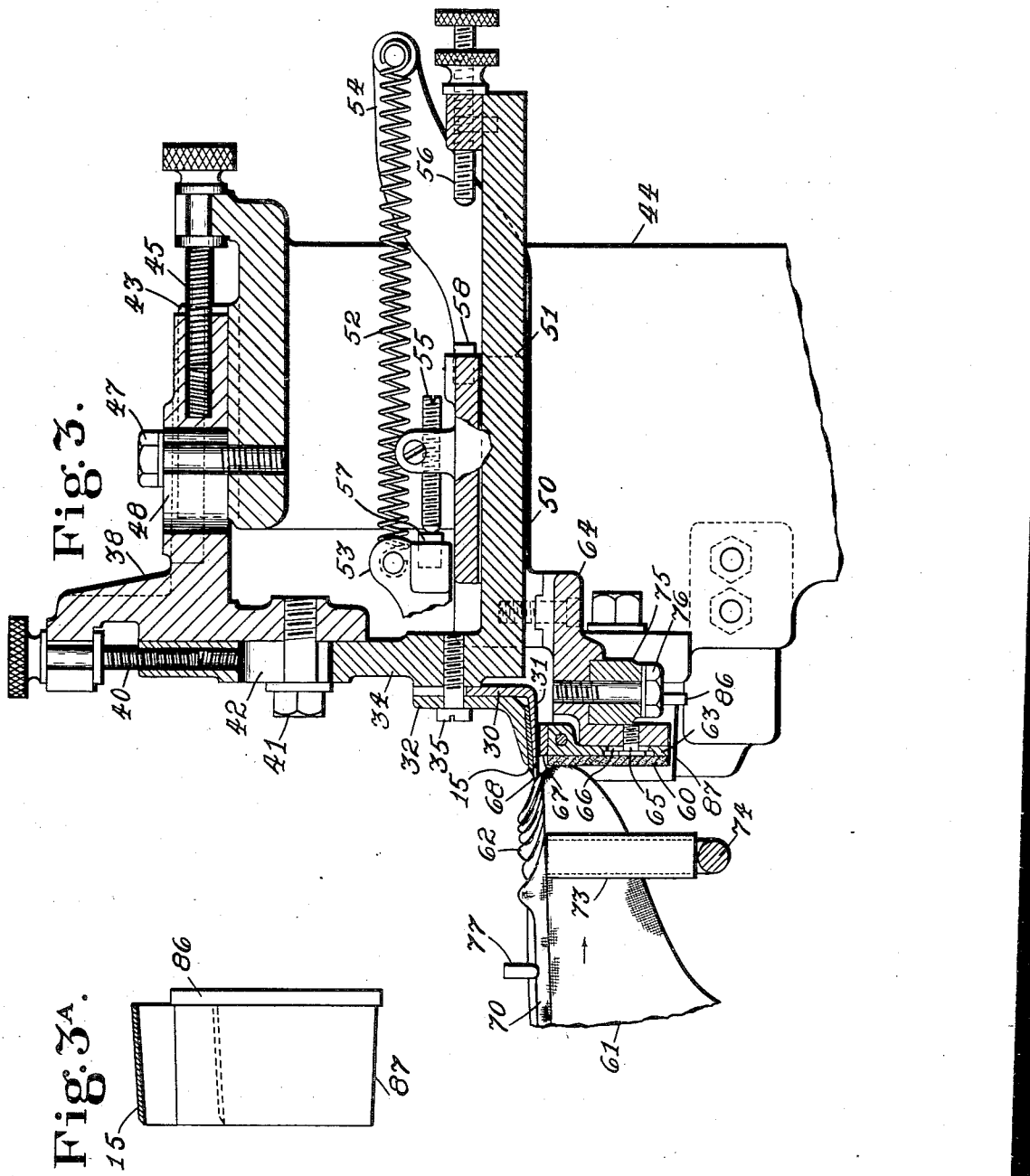

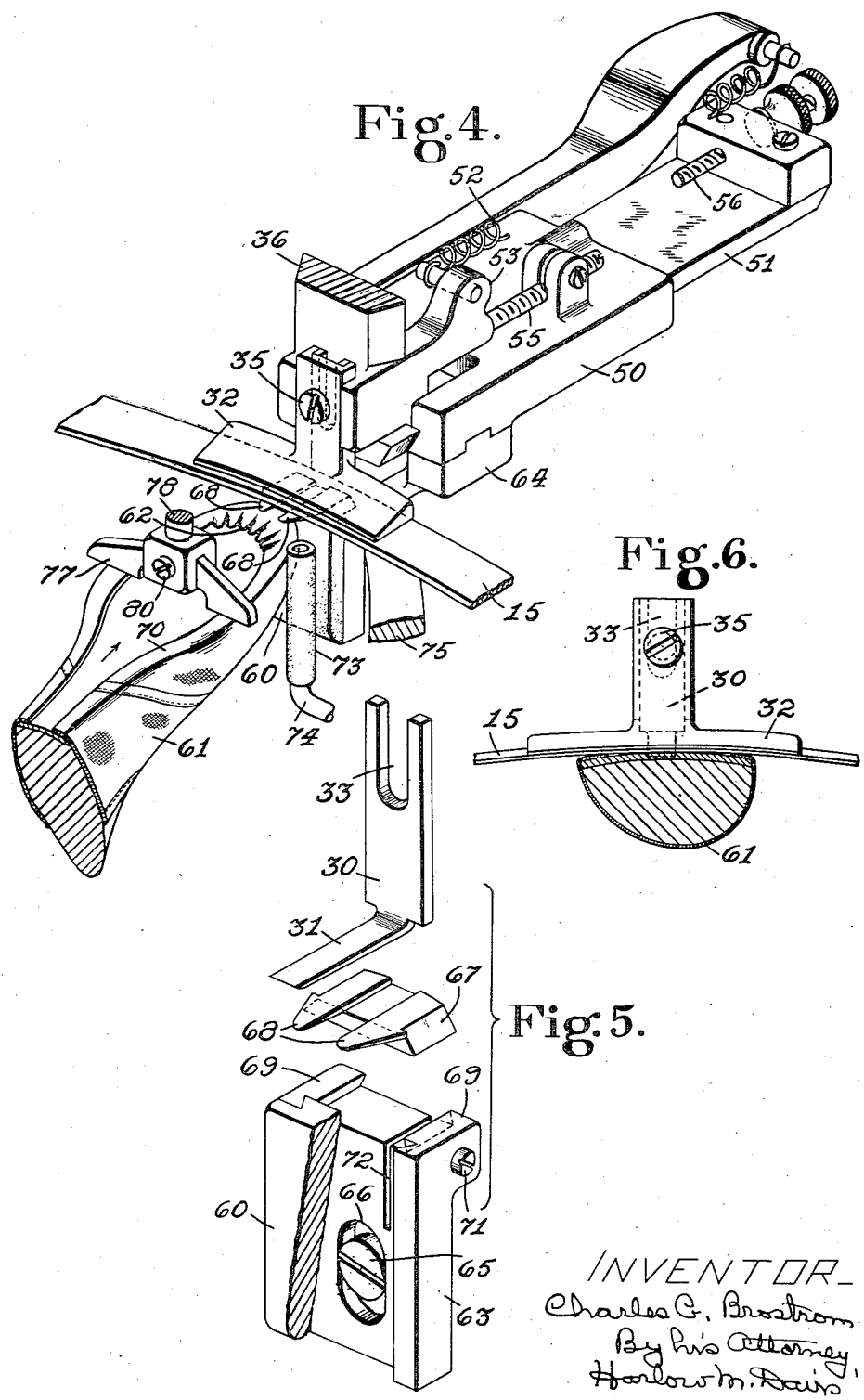

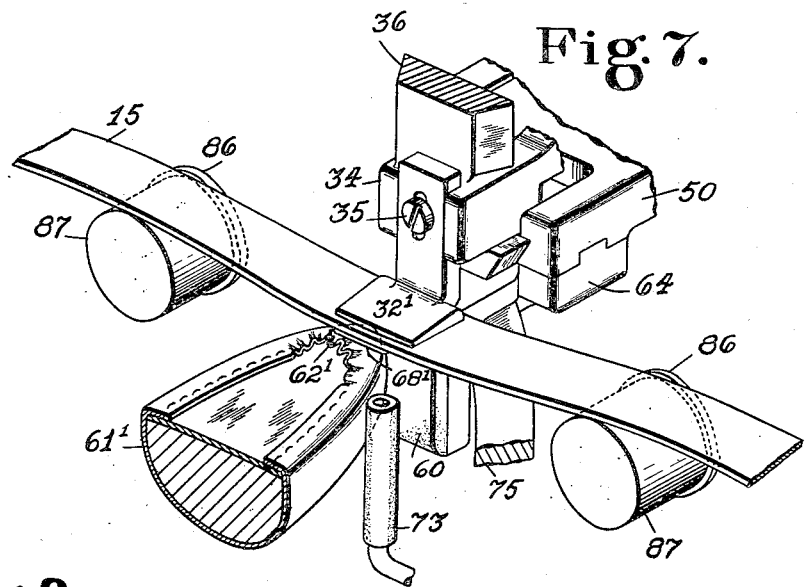
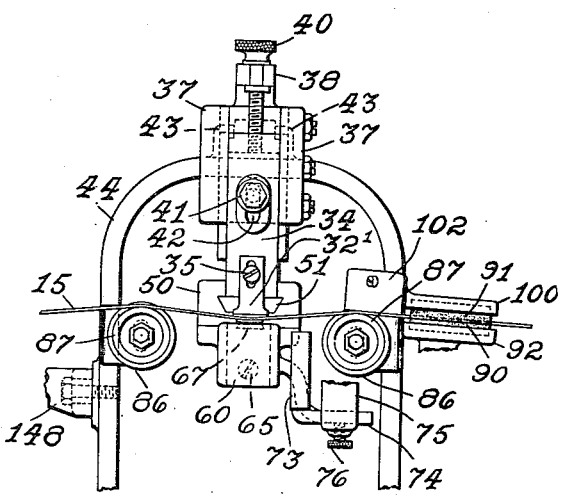
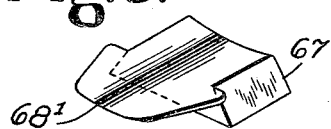
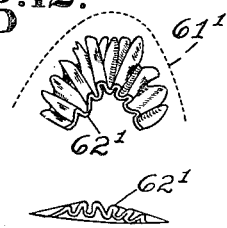
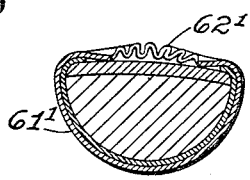

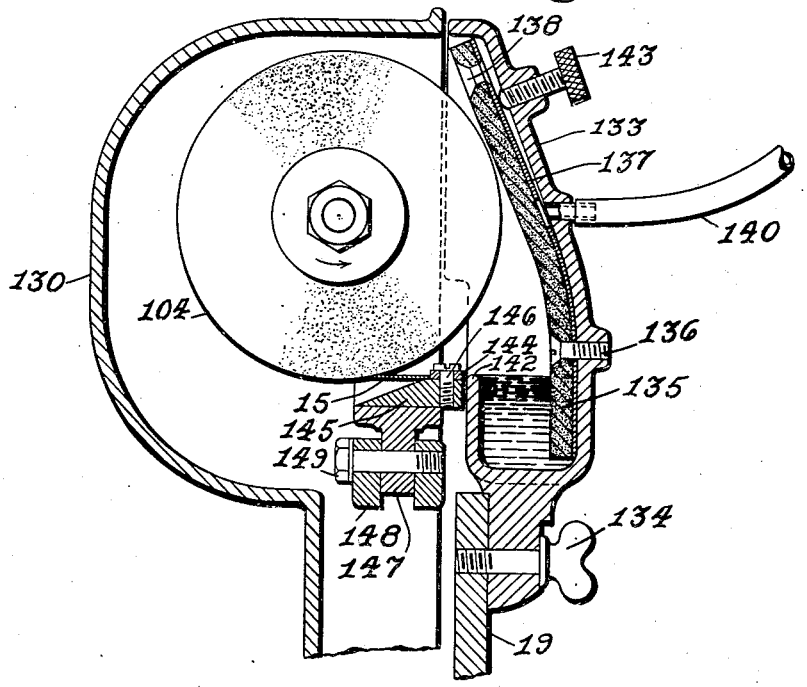
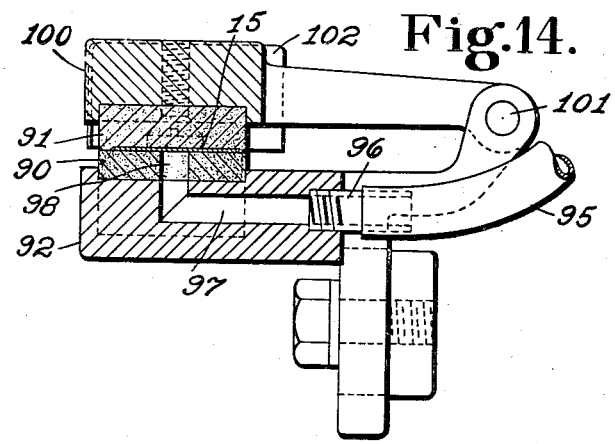

1,976,770

UNITED STATES PATENT OFFICE 1,976,770

TRIMMING MACHINE

Charles G. Brostrom, Lynn, Mass., assignor to United Shoe Machinery Corporation, Paterson, N. J., a corporation of New Jersey Application December 24, 1931, Serial No. 583,031

22 Claims. (Cl. 12—83.5)

This invention relates to trimming machines and is herein illustrated as embodied in a machine designed to trim parts of lasted boots and shoes, for example, the folds or pleats of crimped upper material that lie on the toe ends of the insoles of lasted boots and shoes. In shoes to be provided with cement-attached outsoles the inturned margins of upper material must be smooth and free from lumps before the outsoles are laid, since lumps would not only weaken the bonds of adhesion of the outsoles but would also produce unevenness of the outsoles. These considerations are true not only with respect to leather-soled shoes but also with respect to rubber-soled shoes, since in both types the lasting operation produces lumps of upper material on the toe-ends of the insoles in consequence of crimping and pleating the overdrawn margins of the uppers in lasting the toes. It is therefore necessary, before laying the outsoles, to trim off such lumps approximately flush with the non-crimped marginal portions of upper material lying on the sides of the insoles.

Accordingly, an object of the present invention is to provide an improved trimming machine adapted to skive lumps such as folds or pleats, to the end that the toe-portions of lasted boots and shoes, for example, when trimmed thereby, will be rendered smooth and even by way of being prepared for the reception of outsoles.

To this end the illustrated trimming machine comprises a band-knife the cutting edge of which travels lengthwise across the toe-end of a shoe, thereby skiving the folds or pleats with a draw-cut. Because of conditions hereinafter described, it is preferable to sever the folds or pleats with curved cuts rather than with cuts that lie in a strictly flat plane. The best results are obtained in operating upon shoes of certain types by curving the cutting portion of the knife so that its curvature will conform approximately to the transverse convexity of the bottom of the last on which the shoe is made. Rubber-soled shoes of the "sneaker" type are in this category. On the other hand, in operating upon shoes of other types it is preferable to curve the cutting portion of the knife in the opposite direction, thereby obtaining a scooping cut comparable to that of a gouge. Leather-soled shoes are in the latter category. A scooping cut relieves the inturned margin of the upper material at its inner edge without skiving it at the perimeter of the shoe-bottom, thereby insuring contact and a close firm union of a leather outsole with the perimeter. Corresponding relief is not necessary in shoes of the sneaker type because rubber soles, being more flexible, may be conformed more readily to curved surfaces and because the margins of rubber soles attached to sneakers are folded against, and vulcanized to, the sides of the sneakers.

With a view to dealing with conditions such as those above described, the present invention is herein illustrated as embodied in a machine comprising a trimming knife having a flexible trimming portion, work-guiding means arranged to control presentation of a lasted shoe to the trimming portion of the knife, and means for supporting differently shaped detachable and alternative knife-guides by which the cutting portion of the knife may be curved alternatively in opposite directions according to requirements of the shoes to be trimmed thereby.

In the illustrated machine a band-knife is arranged to run on a driving pulley and on an idle pulley, the work-guiding means being between these pulleys and being constructed and arranged to control presentation of a shoe to that stretch of the band-knife that travels from the driving pulley to the idle pulley. Since propulsion of the specified stretch of the illustrated band-knife comprises a component of pushing as well as a component of pulling, that stretch, herein for convenience termed the "pushed stretch", is not subject to so great a tension as the stretch that travels from the idle pulley to the driving pulley, the latter part of the knife being herein termed the "pulled stretch". Consequently, it may be more easily flexed than the latter stretch to provide an accessible curved portion for operating on the work.

Accordingly, the trimming portion of the illustrated band-knife is in the pushed stretch, and that portion of the knife is deflected from its normal path of travel by a guiding member and thereby caused to follow a curvilinear course where it engages the work. The utilization of the pushed stretch, rather than the pulled stretch, of the band-knife for cutting duty is particularly advantageous when, as herein illustrated, the trimming portion is curved, since the driving force by which it is pushed tends to buckle the trimming portion and thereby relieves, in some degree, the friction due to the rubbing of that portion on the guiding member by which the curved formation is maintained.

Still another feature of the invention consists in an improved organization of work-guiding elements and knife-guiding elements which not only enables the user quickly to place each shoe in a certain definite relation to the band-knife but also provides for regulating the curvature of the trimming portion of the knife without altering the relation between a shoe and the trimming portion. The illustrated work-guiding elements are arranged to move with a work-piece transversely of the cutting edge of the knife and are organized to guide a shoe past the cutting edge with a control that guards against all rocking of the shoe, provided the user maintains the shoe against the gages intended for that purpose. In the use of the illustrated work-guiding means sidewise rocking of a shoe is prevented by a pair of depending gages or abutments against which the upturned bottom of the shoe is held, these gages being arranged to bear on opposite margins of the forepart at or near the ball-portion. Longitudinal rocking is prevented by the gages above mentioned in combination with one or more gages arranged to bear on the margin of the toe-end of the shoe, the latter gage or gages being movable under the cutting portion of the band-knife and nearly, if not quite, in contact therewith. In the illustrated embodiment of the invention, sidewise register of the shoe is controlled by a vertical gage arranged to engage the perimeter of the forepart between the toe-end and the ball-portion. All these gages are illustrated as affixed to a carriage by which they are constrained to move in straight lines with a shoe from which the carriage receives motion as the user advances the shoe toe-foremost under the cutting portion of the band-knife, the illustrated carriage being retracted after the trimming without effort on the part of the operator, as by a spring. Moreover, the several illustrated gages are adjustable to regulate the relation of the work to the knife according to the conditions encountered and the results desired.

The invention further provides improved means for cleaning and lubricating a knife such, for example, as a band-knife, and improved means for extinguishing sparks that fly from a grinding wheel arranged to sharpen the knife. The spark-extinguishing means constitutes the subject-matter of a divisional application Ser. No. 638,934, filed October 21, 1932.

Referring to the drawings,

Fig. 1 is a front elevation, partly broken away, of a trimming machine in which the several features of the present invention are embodied;

Fig. 2 is a top plan view thereof, some of the parts being broken away and others being represented in section;

Fig. 3 is a section in a vertical plane from front to rear through the elements adjacent to the trimming locality;

Fig. 3A represents the trimming portion of the band-knife in cross-section and includes one of the knife-guiding rolls in elevation to illustrate a slight helicoidal twist imparted to the trimming portion of the knife. The direction of view is the same as that of Fig. 3;

Fig. 4 is a perspective view, partly in section, of the elements adjacent to the trimming locality;

Fig. 5 is a perspective view, partly in section, of some of the elements included in Fig. 4, these elements being separated from each other in Fig. 5 to illustrate their individuality and their physical characteristics;

Fig. 6 illustrates the trimming portion of the band-knife and its curvature-controlling members in front elevation, a portion of a lasted shoe being represented in cross-section;

Fig. 7 is a perspective view similar to Fig. 4 but including a lasted shoe of another type and illustrating an alternative curvature of the trimming portion of the knife;

Fig. 8 is a perspective view of one of the elements included in Fig. 7 but almost entirely concealed from view in that figure;

Fig. 9 is a front elevation of the assemblage of parts adjacent to the trimming locality organized and adjusted to curve the trimming portion of the band-knife in accordance with the showing in Fig. 7;

Fig. 10 is a cross-sectional view through the forepart of a lasted shoe of the type included in Fig. 7;

Fig. 11 is an edge view of a severed chip or scrap of crimped and pleated upper material corresponding to the unsevered crimped material represented in Fig. 10, and the direction of the view being the same as that of Fig. 10;

Fig. 12 is a top-plan view of a chip or scrap of severed material corresponding to that shown in Fig. 11, the dotted line in Fig. 12 representing the perimeter of the toe-end of a lasted shoe;

Fig. 13 is a section in a vertical plane of an improved device for extinguishing sparks produced by an abrading wheel provided for sharpening the band-knife; and Fig. 14 is a sectional view in a vertical plane of a device for cleaning and lubricating the band-knife.

A thin flexible band-knife 15 is arranged to run on a driving pulley 16 and an idle pulley 17 that rotate in the direction indicated by arrows in Fig. 1 and are spaced apart to provide for presentation of a lasted shoe to an intermediate trimming portion of the knife between the pulleys. Each of these pulleys is provided with a flange 49 to guide the band-knife by engagement with its rear edge, and the peripheries of the pulleys are slightly tapered, that is, frusto-conical, their larger diameters being adjacent to the flanges. The rear edge of the band-knife is thus maintained against the flanges, and the front edge, which is the cutting edge, is relieved from pressure against the pulleys.

The shaft 18 by which the pulley 16 is driven is journaled in a frame 19 but the shaft 20 of the idle pulley 17 is journaled in a horizontally movable slide 21 by which moderate tension of the band-knife is maintained. The slide 21 is mounted in guides 22 affixed to the frame 19 and receives knife-tensioning force from a weight 23 to which it is connected by a cord or chain 24 that runs over a sheave 25. The band-knife may be slackened when removal from the pulleys is necessary by depressing a hand lever 26 provided with a cam 27 arranged to engage an upright surface of the slide 21.

Power for driving the pulley 16 is derived from a countershaft (not shown) journaled in the lower part of the frame 19, a belt 28 being arranged to transmit rotation from a pulley on said countershaft to a pulley 29 keyed on the rear end of the shaft 18 (see Fig. 2).

The illustrated machine is provided with work-guiding means arranged to control presentation of a lasted shoe to the upper stretch of the band-knife 15 between the pulleys 16 and 17, this stretch of the band-knife being propelled by a component of pushing in addition to a component of pulling. Moreover, the trimming portion of the band-knife is regulatably curved in consequence of being guided or deflected from its normal path by an adjustable guiding member. When the machine is equipped and adjusted as represented in Figs. 1 to 6 inclusive, the knife-guiding member 30 is used (see Figs. 3 and 5), but when it is desired to curve the trimming portion of the band-knife in the opposite direction the guiding member 30 is detached and one of a different shape is substituted in its stead. The member 30 is provided with a laterally extending finger 31 arranged to project forwardly under the trimming portion of the band-knife and to engage the lower surface thereof as shown in Fig. 3. Preferably, the upstanding shank portion of the member 30 is nested in another detachable member 32, the latter being arranged to engage the upper surface of the band-knife and being slightly curved (see Fig. 4) in accordance with the curvature imparted to the trimming portion by the finger 31. Although the finger 31 and the member 32 engage opposite faces of the band-knife, they are spaced apart sufficiently to avoid clamping pressure against the knife, the member 30 being formed with a vertical slot 33 that provides for relative adjustment of these members. The members 30 and 32 are both secured to a vertically adjustable bracket 34 by a clamping screw 35 that extends through a hole in the member 32 and through the slot in the member 30. When the screw is relaxed, the member 30 is capable of vertical adjustment, but when the screw is tightened, both members are clamped tightly thereby against the bracket 34. This bracket is provided with a dove-tail portion 36 (Figs. 4 and 7) arranged to slide in vertical guides 37 (Figs. 1 and 9) formed in a horizontally adjustable bracket 38. Vertical adjustment of the bracket 34 may be effected by an adjusting screw 40, and when the desired adjustment has been made the bracket 34 may be rigidly secured by a clamping bolt 41 that extends through a vertical slot 42 in the bracket 34.

The horizontally adjustable bracket 38 is arranged in horizontal guides 43 formed on the upper part of a fixture 44. The latter is attached to the frame 19 by bolts 45. An adjusting screw 46 connecting the fixture and the bracket 38, as shown in Figs. 2 and 3, provides for adjusting the bracket horizontally, while a clamping bolt 47 extending through a slot 48 in the bracket provides for securing the latter rigidly to the fixture.

When the vertically adjustable bracket 34 is near the upper limit of its range of vertical adjustment as illustrated in Figs. 1 and 3, the trimming portion of the band-knife is raised above its normal level by the finger 31, and this portion is thereby curved over the finger as illustrated in Figs. 4 and 6. Referring to Fig. 3, it is to be noted that the confronting knife-engaging surfaces of the finger 31 and the member 32 are slightly inclined in a direction that raises the rear edge of the trimming portion of the band-knife above the level of the cutting edge thereof. In Fig. 3A, the element represented in cross-section corresponds to the trimming portion of the band-knife as curved and adjusted in accordance with the showing in Figs. 1, 3, 4, and 6, but the element represented by dotted lines in Fig. 3A corresponds to another regulation of the trimming portion of the band-knife in accordance with the showing in Figs. 7 and 9. Viewing the trimming portion of the band-knife in cross-section, the upper and lower surfaces thereof would normally be horizontal since the axes of the pulleys 16 and 17 are horizontal, but the slight inclination of the confronting faces of the finger 31 and the member 32 imparts a helicoidal twist of small degree to the trimming portion of the knife to the end that the cutting edge thereof may operate with a slightly emphasized factor of penetration.

The illustrated work-guiding means is arranged to control presentation of the toe-end of a lasted shoe to the band-knife as illustrated in Figs. 2, 3, and 4 for shoes of one type and as illustrated in Fig. 7 for shoes of another type. Moreover, all the individual work-positioning members are movable with the work in a direction transverse to the path of travel of the trimming knife, and in addition they are interconnected with the knife-guiding members 30 and 32 to partake of vertical adjustments by which the curvature of the trimming portion of the knife may be regulated.

As illustrated in Figs. 1, 2, and 9, the work-engaging members are all attached to and carried by a horizontally movable slide 50 supported by a dove-tail portion 51 of the bracket 34. The slide 50 is movable from front to rear, that is, in lines transverse to the path of the band-knife 15, and is normally drawn toward the front of the machine by a tension spring 52, one end of which is attached to an ear 53 of the bracket 34 and the other end of which is attached to an arm 54 of the slide. Both limits of movement of the slide may be regulated independently of each other, one by an adjusting screw 55 and the other by an adjusting screw 56. The screw 55 is carried by the slide 50 and is arranged to abut a pad or plug 57 inserted into a socket in the ear 53. The member 57 is preferably made of some resilient cushioning material, such as leather, to render the impacts of the screw 55 silent. The screw 56 is mounted on the bracket 51 and is arranged to be engaged by a plug 58 of resilient silencing material carried by the slide 50.

As shown in Fig. 3, the slide 50 is provided with an upstanding pad 60 of cushioning material, such as felt, against which the toe-end of a shoe 61 may abut. In practice, an operator will support the forepart of an inverted lasted shoe with the left hand while grasping the heel-end of the shoe with the right hand and, after placing the toe-end of the shoe against the pad 60 as shown in Figs. 3 and 4, will thrust the shoe, toe foremost, toward the rear of the machine, an arrow in Fig. 3 indicating the direction of feeding movement thus imparted to the shoe to carry the pleats 62 thereof against the cutting edge of the band-knife.

The pad 60 has dove-tail connection with a vertically adjustable block 63 carried by the slide 50 to which it is connected by a bracket 64. A clamping screw 65 secures the block 63 to the bracket 64, while a slot 66 in the block provides for vertical adjustment thereof.

The level of the toe-end of a shoe is controlled by a member provided with a dove-tail portion 67 (Fig. 5) and with two spaced tongues 68 that project initially in front of the cutting edge of the band-knife between the latter and the pad 60. The space between the tongues 68 is initially occupied by the stationary knife-guiding finger 31. As shown in Figs. 2 and 4, the tongues 68 are arranged to lie on the outer band of the overdrawn margin 70 of upper material without masking the pleats 62. The dove-tail portion 67 is mortised into the block 63 (Fig. 5) and is tightly clamped by a screw 71, the block being provided with a kerf 72 by which opposite portions of the block are divided to provide jaws 69 for clamping the dove-tail portion.

The toe-end of a shoe is registered sidewise by an upstanding abutment 73 which is preferably a short piece of rubber tubing surrounding a stem 74. As shown in Figs. 1 and 2, this abutment is carried by a bracket 75 to which a horizontal portion of the stem is adjustably secured by a set-screw 76. The bracket 75 is carried by the slide 50 to which it is connected by the bracket 64 as shown in Fig. 3, a bolt 76 serving to connect the two brackets rigidly one to the other.

The bracket 75 also carries a work-controlling member 77 formed and arranged to engage the upturned bottom of a lasted shoe at two opposite marginal points adjacent to the ball portion thereof (see Figs. 3 and 4). The member 77 not only braces the shoe against sidewise rocking but it also cooperates with the tongues 68 to brace the shoe against longitudinal rocking. The member 77 is mortised into the lower end of a vertical stem 78 and affixed thereto by a screw 80 (Fig. 4). The stem 78 is vertically and angularly adjustable in one end of a bracket 81 to which it is clamped by a notched draw-bolt 82 and a nut 83 (Fig. 2). Vertical adjustment thereof provides for regulating the depth of the trimming cut. The other end of the bracket 81 is affixed to the forward end of the bracket 75 by a clamping bolt 84. The bracket 81 may have angular adjustment about the bolt 84 and may have lateral adjustment within the limits of a slot 85 formed therein to receive the bolt.

The initial positions of the work-guiding members 68, 73, and 77 are shown in Figs. 2, 3, and 4. When a shoe is placed in contact with these members and held against them with a component of upward force and with a component of lateral force of the forepart against the abutment 73, presentation of the shoe to the trimming portion of the band-knife is definitely controlled to insure severance of the pleats 62 in consequence of moving the shoe toe foremost in the direction indicated by arrows in these figures. As the shoe is advanced, its toe-end abutting the pad 60 as shown in Fig. 3, it moves the slide 50 in opposition to the applied force of the spring 52, the slide causing the several work-positioning members to move with the shoe throughout the entire range of travel of the carriage not only in the direction indicated by the arrows but also in the opposite direction when the trimmed shoe is retracted.

As the shoe is fed against the cutting edge of the band-knife, the trimming portion thereof travels across the toe-end of the shoe from side to side, thereby severing the pleats 62 with a draw-cut. Since the trimming portion of the knife moves from left to right and since the abutment 73 engages the right-hand side of the forepart of the shoe, this abutment sustains the frictional drag of the knife on the work. Referring to Fig. 3, it may be noted that the upper end of the abutment 73 is slightly below the level of the band-knife and may therefore pass under the latter without interference. Moreover, although the tongues 68 project initially in front of the cutting edge of the band-knife, they are carried to the rear by the movement of the slide 50, but the knife-guiding finger 31 remains stationary not only to support the trimming portion of the band-knife at a constant level but also to maintain the described curvature of said portion.

The shoe 61 represented in Figs. 2, 3, 4, and 6 is a sneaker, the trimming of which is more satisfactory when the trimming portion of the band-knife is curved as illustrated in Figs. 1, 4, and 6, the curvature illustrated in these figures conforming approximately to the transverse curvature of the shoe bottom. The degree of curvature may be regulated by adjusting the bracket 34 up or down by means of the adjusting screw 40 and, while such regulation causes an upward or downward movement of the trimming portion of the band-knife, it does not disturb the cooperative relation between the trimming portion and the work controlling members since the latter, being carried by the same bracket 34, partake of all such adjustments to the same extent as the band-knife partakes of them.

The trimming portion of the band-knife is sustained against displacement toward the rear by flanges 86 at the rear ends of idle rolls 87 over which the upper stretch of the band-knife travels. These rolls are located at opposite sides of the trimming locality (see Figs. 1 and 2) and are attached to the fixture 44. As shown in Figs. 2 and 3A, the flanges 86 engage the rear edge of the band-knife.

Lasted shoes of another type may be more satisfactorily trimmed with a scooping cut which requires curving the trimming portion of the band-knife in the opposite direction relatively to the curvature illustrated in Figs. 1, 4, and 6. For example, the shoe 61' represented in Figs. 7, 10, and 12 is one comprising an upper and an insole both made of leather and intended to be provided with a leather outsole to be attached with adhesive cement. In Figs. 7 and 10, the unsevered pleats at the toe-end of the shoe are indicated at 62', while in Figs. 11 and 12, these pleats are represented as having been severed with a scooping cut, the perimeter of the toe-end of the shoe being represented in Fig. 12 by a dotted line 61' to illustrate the relation of the pleats to the perimeter before the pleats have been severed.

The curvature of the trimming portion of the band-knife may be regulated to sever the pleats with a scooping cut by adjusting the bracket 34 downwardly and substituting the knife-engaging members 32' and 68' (Figs. 7 and 8) to supersede three members included in Fig. 3, namely, the two knife-engaging members 30 and 32 and the work-engaging member provided with the tongues 68. When the attaching screw 35 is detached the members 30 and 32 may be detached, and the member 32' may be attached in their stead by the screw 35 as illustrated in Fig. 7. Although the member 32' occupies a position corresponding to that of the member 32, that is, a position above the band-knife, its function is more closely analogous to the function of the finger 31 of the member 30, since it constitutes the element by which the trimming portion of the band-knife is deflected from its normal path and curved in the opposite direction. The member illustrated in Fig. 8 is provided with a work-engaging tongue 68' and with a dove-tail portion 67, the latter portion being identical with the corresponding portion 67 represented in Fig. 5 both physically and functionally. When the member shown in Fig. 8 is substituted for the corresponding member shown in Fig. 5, it is clamped to the block 63 by the screw 71, the tongue 68' then projecting initially in front of the cutting edge of the band-knife as represented in Fig. 7. The knife-engaging surface of the member 32' is curved in the opposite direction in comparison with the corresponding curvature of the member 32 (Figs. 4 and 6). Moreover, the upper surface of the member shown in Fig. 8 is preferably curved in accordance with the curvature of the member 32' to provide a suitable channel of uniform depth through which the trimming portion of the band-knife may travel.

When these substitute knife-guiding members are attached as illustrated in Figs. 7 and 9, the bracket 34 will be adjusted to a lower position within the limits of the slot 42, the knife-guiding member 32 being thereby caused to depress the trimming portion of the band-knife below its normal path of travel between the idle rolls 87. Under these conditions also the work-engaging abutments 60, 73, and 77 partake of downward adjustment of the bracket 34, their cooperative relation to the trimming portion of the band-knife being thereby maintained notwithstanding reversal of the curvature of the trimming portion and notwithstanding the location of the trimming portion at a lower level.

To avoid the accumulation of dust, chips, and particles of adhesive cement on the band-knife, the illustrated machine is provided with cooperative pads 90 and 91 of absorbent material, such as felt, the pads being arranged in confronting relation as shown in Fig. 14 to wipe both surfaces of the band-knife. These pads are preferably mounted between the trimming locality and the idle pulley 17 (see Fig. 1), since their frictional drag on the knife, though not great, is of some advantage at this point in that it diminishes the tension of the trimming portion of the band-knife and causes a corresponding increase of the pushing component by which the trimming portion is propelled past the trimming locality. The slight tendency of the trimming portion to buckle under the pushing force affords some relief of the pressure of the knife against the deflecting member 31 (Fig. 5) or the deflecting member 32' (Fig. 8) as the case may be. Moreover, the member 31 must be thin to lie between the band-knife and the work and at the same time permit the band-knife to sever the pleats from the work, and since the member 31 is subjected to constant rubbing by the knife any factor that reduces the pressure of the knife against it will materially prolong its period of utility.

Preferably, the pads 90 and 91 are saturated with water to increase their cleaning effect and prevent their being burned by the constant friction generated by the knife. For this purpose, the lower pad 90 is imbedded in a supporting bracket to which water may be supplied by the force of gravity from a reservoir 93 (Fig. 1). The discharge of water from the reservoir may be controlled by a regulating valve 94 and the water may be conducted therefrom by a flexible rubber tube 95, the delivery end of which is connected to the bracket 92 by a nipple 96 as shown in Fig. 14. The water flows through a duct 97 in the bracket and through a registering duct 98 in the pad 90 into contact with the lower surface of the band-knife, and at the same time some of it saturates the pad 90. Preferably, the front and rear margins of the two pads extend beyond the edges of the band-knife sufficiently to touch each other and thus provide for capillary flow of some of the water from the lower pad to the upper pad, the latter being thereby supplied with water to clean the upper surface of the knife. The bracket 92 is mounted upon a portion of the frame 19 to which it is connected by a pivot member 99 and by a clamping bolt 103, a slot in the bracket for the reception of the clamping bolt affording angular adjustment of the bracket about the pivot member. The upper pad is imbedded in and attached to a holder 100, the weight of which insures moderate clamping of the band-knife by the pads. The holder 100 is connected to the bracket 92 by a pivot pin 101 about which it may be swung to release the band-knife from the pads. The holder 100 also carries a metallic plate 102, the lower edge of which scrapes chips and particles of dirt from that portion of the knife that is about to pass between the pads. As shown in Fig. 2, the scraper 102 is maintained in oblique relation to the band-knife, the better to deflect particles therefrom.

The machine is also provided with an abrading wheel 104 with which to sharpen the cutting edge of the band-knife (see Figs. 1, 2, and 13). This wheel is so mounted as to be movable to and from engagement with the band-knife, and for this purpose the shaft 105 by which it is carried and driven is journaled in a two-part arm comprising a member 106 and a member 107. The latter member is pivotally connected to a fixture 108 by a rod 109. The members 106 and 107 are adjustably connected to each other by tongue-and-groove formations 110 and by a clamping bolt 111, the latter extending through a slot 112 in the member 106, which slot provides for adjusting the abrading wheel toward the rear of the machine as the cutting edge of the band-knife is ground back by repeated sharpening operations.

The means for driving the abrading wheel 104 includes a pulley 113 on the shaft 105, a belt 114, a double pulley 115 loosely mounted on the rod 109, and a belt 116 by which rotation is transmitted to the double pulley from a countershaft (not shown) in the lower part of the frame 19.

To maintain suitable tension of the belt 114 notwithstanding adjustments of the abrading wheel toward the front or rear, the member 107 is provided with a vertically adjustable slide 120 that carries a take-up roll 121 in engagement with one stretch of the belt. Vertical adjustment of the take-up roll to regulate the tension of the belt may be effected by a screw 122 (Fig. 1).

For the purpose of raising and lowering the abrading wheel, a rod 123 is arranged to extend vertically through a hole in the member 107 and is provided with a hand wheel 124 at its upper end. The lower end of this rod is provided with a screw thread that engages a nut 125 in the form of a cylindrical plug. This plug occupies a socket formed in a portion of the fixture 108. A compression spring 126 surrounds the rod 123 and exerts pressure upwardly against an under surface of the member 107 to raise the abrading wheel. By turning the hand wheel 124, the abrading wheel may be depressed into engagement with the band-knife.

In many shoe factories, pyroxylin cement is used to attach the overdrawn marginal portions of shoe-uppers to insoles of lasted shoes, and since cement of that type is highly inflammable and since scraps of waste trimmed from lasted shoes accumulate on the floor in the vicinity of the trimming machine it is desirable, if not actually required by anti-fire regulations, to guard against igniting the cement-coated scraps with sparks generated by the abrading wheel 104. Accordingly, the illustrated machine is provided with an improved device for extinguishing the sparks adjacent to the point where they are generated. As shown in Figs. 2 and 13, the abrading wheel is almost entirely enclosed in a metallic cowl 130. This cowl is an integral portion of a relatively large cowl 131 that encloses the driving pulley 16 and the forward portion of the arm member 106. The cowl 131 is connected to the frame 19 by a hinge 132 that provides for swinging it away from its operative position when a band-knife is about to be attached or detached. The cowl for enclosing the abrading wheel 104 also includes a fixed section 133 detachably secured to the frame 19 by a bolt 134. A pad 135 of absorbent material, such as felt, is attached by one or more screws 136 to the inner surface of an upright wall of the fixed section 133 and is backed or reinforced by a resilient metallic plate 137 preferably made of some non-rusting metal, such as brass. The pad 135 and the backing plate 137 are also preferably connected in contiguous relation to each other by one or more rivets 138. The pad is moistened with water that may be conducted to it from the reservoir 93 (Fig. 1) through a flexible rubber tube 140 and a regulating valve 141. The fixed section 133 is formed to provide a basin 142 below the contiguous portions of the abrading wheel 104 and the pad 135, the lower margin of the pad being arranged in the basin so that it will be submerged in water that accumulates therein. Thus, the pad will be maintained in a state of saturation so long as water is maintained in the basin. An adjusting screw 143 extends through a wall of the fixed section 133 and engages the rear face of the backing plate 137 to adjust the pad so that it will almost touch the periphery of the abrading wheel without quite doing so.

In operation, the abrading wheel is driven in the direction indicated by an arrow and the sparks produced by its action on the band-knife are thrown by centrifugal force against the wet pad at a point directly over the body of water contained in the basin 142. Consequently, when the sparks are arrested by the pad they will fall into the basin of water and will be thereby extinguished if they have not been previously extinguished by contact with the wet pad.

At a point in register with the abrading wheel, the rear edge of the band-knife is braced or backed by a roll 144 mounted on a stationary block 145 and attached thereto by a pivot member 146, the block being arranged to underlie and engage the band-knife to support the latter against the abrading wheel but having a notch slightly wider than the wheel for clearance thereof. The block 145 is affixed to a supporting member 147 pivotally connected to a bracket 148 by a clamping bolt 149. The bracket 148 is affixed to the fixture 44 (Fig. 1).

Having thus described my invention, what I claim as new and desire to secure by Letters Patent of the United States is:

1. A trimming machine comprising a trimming knife having a flexible trimming portion, work-guiding means arranged to control presentation of the toe-end of a lasted shoe to said trimming portion of the knife, and means for supporting differently shaped detachable and alternative knife-guides by which the trimming portion of the knife may be curved alternatively in opposite directions according to requirements of the shoes to be trimmed thereby.

2. A trimming machine comprising a trimming knife having a flexible trimming portion, adjustable means by which said trimming portion may be regulatably curved, and work-guiding means by which the bottom of a lasted shoe may be located in a desired relation to said trimming portion of the knife, said adjustable means and said work-guiding means being interconnected to change the location of the latter in consequence of curve-regulating adjustment of the former.

3. A trimming machine comprising a flexible band-knife arranged to run on pulleys, work-guiding means arranged to control presentation of the toe end of a lasted shoe to a trimming portion of the band-knife between the pulleys, and adjustable means arranged to guide the trimming portion of the knife away from its normal path and thereby impart a regulatable curvature thereto, said work-guiding means and said knife-guiding means being interconnected to partake of curvature-regulating adjustments, to the end that the cooperative relation of the work-guiding means and the trimming portion of the knife shall be maintained notwithstanding such adjustments.

4. A trimming machine comprising a flexible band-knife, a driving pulley and an idle pulley over which said band-knife runs, one or more wipers arranged to engage that stretch of the band-knife that is pushed by said driving pulley toward said idle pulley, and means arranged to deflect and curve a cutting portion of said pushed stretch of the band-knife between the driving pulley and said wiper or wipers, the pressure of said cutting portion against said deflecting means being diminished by the frictional drag of said wiper or wipers on that portion of the pushed stretch that travels away from the deflecting means.

5. A trimming machine comprising a thin, flexible band-knife having a cutting edge and a rear edge, and two pulleys on which a face of the band-knife is arranged to run and by which the knife is tensioned, each of said pulleys having a flange arranged to engage the rear edge of the knife and also having a frusto-conical periphery the larger diameter of which is adjacent to said flange whereby the rear edge of the knife is maintained against the flange.

6. A trimming machine comprising a flexible band-knife, pulleys on which said band-knife is arranged to run, means for driving one of said pulleys to operate the band-knife, two spaced guiding members arranged to engage a stretch of the band-knife at separate points along its length, means arranged to control presentation of a work-piece to a portion of the band-knife between said members, and means arranged to curve said portion of the band-knife and to impart thereto a helicoidal twist whereby the cutting edge and the rear edge thereof are directed, respectively, toward and away from the work.

7. A trimming machine comprising a work-guiding carriage provided with a plurality of abutments arranged to be engaged respectively by the toe end and the bottom of a lasted shoe, means for guiding said carriage to and fro, yieldable means arranged to return said carriage to an initial position, and cutting means arranged to sever lumps from the bottom of a shoe with a draw cut.

8. A trimming machine comprising a carriage provided with one or more gages for engaging the bottom of a lasted shoe and with an abutment by which the toe end of the shoe may push the carriage, guiding means by which said carriage is constrained to movement in a certain path, a cutter having a cutting edge arranged to trim the shoe bottom with movement crosswise of said path, and means arranged to brace the toe end of the shoe against the drag of said cutter.

9. A trimming machine comprising a horizontally movable carriage provided with one or more gages for engaging the upturned bottom of an inverted lasted shoe and with an abutment by which the toe end of the shoe may push the carriage, guiding means by which said carriage is constrained to movement in a certain path, a cutter having an endless cutting edge movable longitudinally to trim the shoe bottom with movement crosswise of said path, and means carried by said carriage and arranged to engage the perimeter of the shoe adjacent to the toe end thereof to afford sidewise register of the forepart of the shoe.

10. A trimming machine comprising a carriage provided with one or more gages for engaging the bottom of a lasted shoe and with an abutment by which the toe end of the shoe may push the carriage, guiding means by which said carriage is constrained to movement in a certain path, a band-knife the cutting edge of which is arranged to sever surplus material from the bottom of the shoe with a draw-cut, and means for driving said band-knife.

11. A trimming machine comprising a carriage provided with one or more gages for engaging the bottom of a lasted shoe and with an abutment by which the toe end of the shoe may push the carriage, guiding means by which said carriage is constrained to movement in a certain path, a band-knife arranged to sever surplus material from the bottom of the shoe with a draw-cut, adjustable means arranged to engage the cutting portion of the band-knife to control and regulate the closeness of trimming, and means arranged to drive said band-knife.

12. A trimming machine comprising a carriage provided with one or more gages for engaging the bottom of a lasted shoe and with an abutment by which the toe end of the shoe may push the carriage, guiding means by which said carriage is constrained to movement in a certain path, a band-knife arranged to sever surplus material from the bottom of the shoe with a draw-cut, means arranged to curve the cutting portion of the band-knife, and means for driving the band-knife.

13. A trimming machine comprising work-guiding means by which the bottom of a lasted shoe may be braced against rocking and guided in a definite path, and scoop-shaped cutting means arranged to skive lumps from the shoe bottom with a concave cut.

14. A trimming machine comprising work-guiding means by which the bottom of a lasted shoe may be braced against rocking and guided in a definite path, a cutter curved and arranged to sever lumps from the shoe bottom with a concave skiving cut, and means for causing said cutter to execute a draw-cut.

15. A trimming machine comprising a carriage provided with one or more gages for engaging the bottom of a lasted shoe and with an abutment by which the toe end of the shoe may push the carriage, guiding means by which said carriage is constrained to movement in a certain path, a band-knife arranged to sever surplus material from the bottom of the shoe with a draw-cut, means arranged to curve the cutting portion of the band-knife so as to produce a scooping cut, and means for driving said band-knife.

16. A trimming machine comprising a flexible band-knife, pulleys on which said band-knife is arranged to run, means for driving one of said pulleys, means arranged to deflect from its normal path of travel an intermediate portion of the band-knife that lies between said pulleys, said deflecting means being adjustable to regulate its deflecting effect, and work-guiding means arranged to partake of deflection-regulating movement of said knife-guiding means.

17. A trimming machine comprising a flexible band-knife, pulleys on which said band-knife is arranged to run, means for driving one of said pulleys, means arranged to deflect from its normal path of travel an intermediate portion of the band-knife that lies between said pulleys, said deflecting means being adjustable to regulate its deflecting effect, and work-guiding means arranged to partake of deflection-regulating movement of said deflecting means but movable relatively thereto by a work-piece being fed across the band-knife.

18. A trimming machine comprising a horizontally movable carriage provided with gages for registering the upturned bottom of an inverted lasted shoe, a vertically adjustable support by which said carriage is guided, a flexible band-knife one stretch of which is substantially horizontal and arranged to sever surplus material from the bottom of a shoe held against said one or more gages, means for driving said band-knife, and knife-guiding means affixed to said vertically adjustable support and arranged to maintain the trimming portion of the band-knife in a certain relation to the path of the registered shoe bottom.

19. In a trimming machine having a flexible band-knife, a cleaning device comprising a pair of separable confronting pads of absorbent material between which a stretch of the band-knife runs, and means arranged to supply a liquid to at least one of said pads, said pads being arranged to project beyond an edge of said knife and to touch each other whereby liquid may flow from one to the other.

20. In a trimming machine having a flexible band-knife a portion of which is approximately horizontal, a cleaning device comprising a pair of confronting pads of absorbent material arranged to engage respectively the upper face and the lower face of said portion of the band-knife, a fixture by which the lower pad is supported, means arranged to supply a liquid to the lower pad, and a movable member by which the upper pad is maintained in operative position so that the force of gravity will cause it normally to lie on the band-knife, said pads being arranged to touch each other beyond one edge of the band-knife.

21. In a trimming machine having a flexible band-knife, a cleaning device comprising relatively movable pad-supporting members between which a portion of the band-knife may run, confronting pads of absorbent material supported respectively by said members and arranged to engage the opposite faces of the band-knife and to engage each other beyond an edge of the band-knife, and means arranged to supply a liquid to at least one of said pads.

22. In a trimming machine having a flexible band-knife, a cleaning device comprising relatively movable supporting members between which a portion of the band-knife may run, confronting pads of absorbent material supported respectively by said members and arranged to engage opposite faces of the band-knife, means arranged to supply a liquid to at least one of said pads, and a deflector supported by one of said members and arranged to dislodge particles from that portion of the band-knife that is about to run between said pads.

CHARLES G. BROSTROM.